United States Patent
Miller et al.

(10) Patent No.: US 11,212,559 B2
(45) Date of Patent: Dec. 28, 2021

(54) SYSTEMS AND METHODS FOR DISPLAYING AND CONTROLLING A REMOTELY EXECUTED APPLICATION ON A DISPLAY OF A VEHICLE

(71) Applicant: Honeywell International Inc., Morris Plains, NJ (US)

(72) Inventors: Larry Miller, Black Canyon City, AZ (US); Jason Bialek, Arlington, WA (US); Andrew Wise, Morris Plains, NJ (US); Pankaj Sharma, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/889,558

(22) Filed: Jun. 1, 2020

(65) Prior Publication Data
US 2021/0377574 A1 Dec. 2, 2021

(51) Int. Cl.
| | | |
|---|---|---|
| *H04N 21/214* | (2011.01) | |
| *H04N 21/231* | (2011.01) | |
| *H04N 21/274* | (2011.01) | |
| *B64D 43/00* | (2006.01) | |
| *H04N 21/2747* | (2011.01) | |

(52) U.S. Cl.
CPC ......... *H04N 21/2146* (2013.01); *B64D 43/00* (2013.01); *H04N 21/231* (2013.01); *H04N 21/2747* (2013.01)

(58) Field of Classification Search
CPC ............. H04N 21/2146; H04N 21/231; H04N 21/2747
USPC ......................................................... 725/76
See application file for complete search history.

(56) References Cited

U.S. PATENT DOCUMENTS

| | | |
|---|---|---|
| 9,288,513 B2 | 3/2016 | Omer et al. |
| 2007/0085907 A1 | 4/2007 | Beauregard |
| 2019/0304209 A1* | 10/2019 | Huynh ..................... G09G 5/00 |
| 2020/0192559 A1* | 6/2020 | Ouellette ............... B64D 43/00 |
| 2021/0051455 A1* | 2/2021 | Panergo ............... G06K 9/6267 |

* cited by examiner

*Primary Examiner* — Dominic D Saltarelli
(74) *Attorney, Agent, or Firm* — Bookoff McAndrews, PLLC

(57) ABSTRACT

Systems and methods for displaying and controlling a remotely executed application on a display of a vehicle are disclosed. A method may include: receiving, by one or more processors, one or more video signals from one or more video sources onboard the vehicle; receiving, by the one or more processors, at a client module, a video signal including an image or display of the application executing on a remote server through a network; combining, by the one or more processors, via a video router, the received one or more video signals from the one or more video sources onboard the vehicle and the video signal including the image or display of the application executing on the remote server; and selectively displaying, by the one or more processors, on a display of the vehicle, the video signal including the image or display of the application executing on the remote server.

20 Claims, 6 Drawing Sheets

SYSTEMS AND METHODS FOR DISPLAYING AND CONTROLLING A REMOTELY EXECUTED APPLICATION ON A DISPLAY OF A VEHICLE

TECHNICAL FIELD

Various embodiments of the present disclosure generally relate to network-connected vehicles and applications and, more particularly, to systems and methods for displaying a remotely executed application on a display of a vehicle.

BACKGROUND

Browsing the Internet, using applications, and/or running programs in a vehicle, such as an aircraft, is currently possible via handheld devices, such as tablet devices or mobile computing devices (e.g., laptops). For example, pilots and crew of aircraft may browse websites using iPads or electronic flight bags (EFBs) for information relevant to the flight path of the aircraft or other information. Pilots and crew may also use such devices for running applications and/or other programs that perform various tasks and provide information related to the vehicle to the pilots and crew. However, security concerns have rendered hosting a browser and certain applications or programs (e.g., including website features/data) on high design assurance level (DAL) systems (e.g., safety-critical systems) difficult or impractical. For example, onboard systems may require software to be certified before being installed on the vehicle and such a browser or application may be difficult to certify due to the constant churn of application, browser, and website features/data. Hosting the software that allows access to this information or enables running these application or programs may also expose the core avionics to cyber-security risks that can only be addressed by updating each vehicle individually, which may be a time-consuming process. Further, hosting a browser, application, and/or program on the vehicle in a lower DAL system and piping the video to a display in the vehicle (e.g., in the cockpit of an aircraft) may still include difficulties in updating.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for displaying a remotely executed application on a display of a vehicle.

In one embodiment, a computer-implemented method for displaying a remotely executed application on a display of a vehicle is disclosed. The method may include: receiving, by one or more processors, one or more video signals from one or more video sources onboard the vehicle; receiving, by the one or more processors, at a client module, a video signal including an image or display of the application executing on a remote server through a network; combining, by the one or more processors, via a video router, the received one or more video signals from the one or more video sources onboard the vehicle and the video signal including the image or display of the application executing on the remote server; and selectively displaying, by the one or more processors, on a display of the vehicle, the video signal including the image or display of the application executing on the remote server.

In another embodiment, a system for displaying a remotely executed application on a display of a vehicle is disclosed. The system may include: a vehicle; one or more video sources located onboard the vehicle; a display onboard the vehicle; a remote server located offboard the vehicle; a video router onboard the vehicle and in communication with the display; and one or more processors in communication with the video router, the one or more processors configured to: receive one or more video signals from the one or more video sources located onboard the vehicle; receive, at a video module, a video signal including an image or display of an application executing on the remote server through a network; combine, via the video router, the received one or more video signals from the one or more video sources located onboard the vehicle and the video signal including the image or display of the application executing on the remote server; and selectively display on the display of the vehicle, the video signal including the image or display of the application executing on the remote server.

In yet another embodiment, a computer-implemented method for displaying a remotely executed application on a display of a vehicle is disclosed. The method may include: receiving, by one or more processors, one or more video signals from one or more video sources; receiving, by the one or more processors, at a client module, a video signal including an image or display of the application executing on a remote server through a network; combining, by the one or more processors, via a video router, the received one or more video signals from the one or more video sources and the video signal including the image or display of the application executing on the remote server; receiving, by the one or more processors, a selection of one or more of the video signals from a first user input; based on the received selection, displaying, by the one or more processors, on a display of the vehicle, the video signal including the image or display of the application executing on the remote server; receiving, by the one or more processors, a second user input from a user; and controlling, by the one or more processors, the application executing on the remote server based on the received user input.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
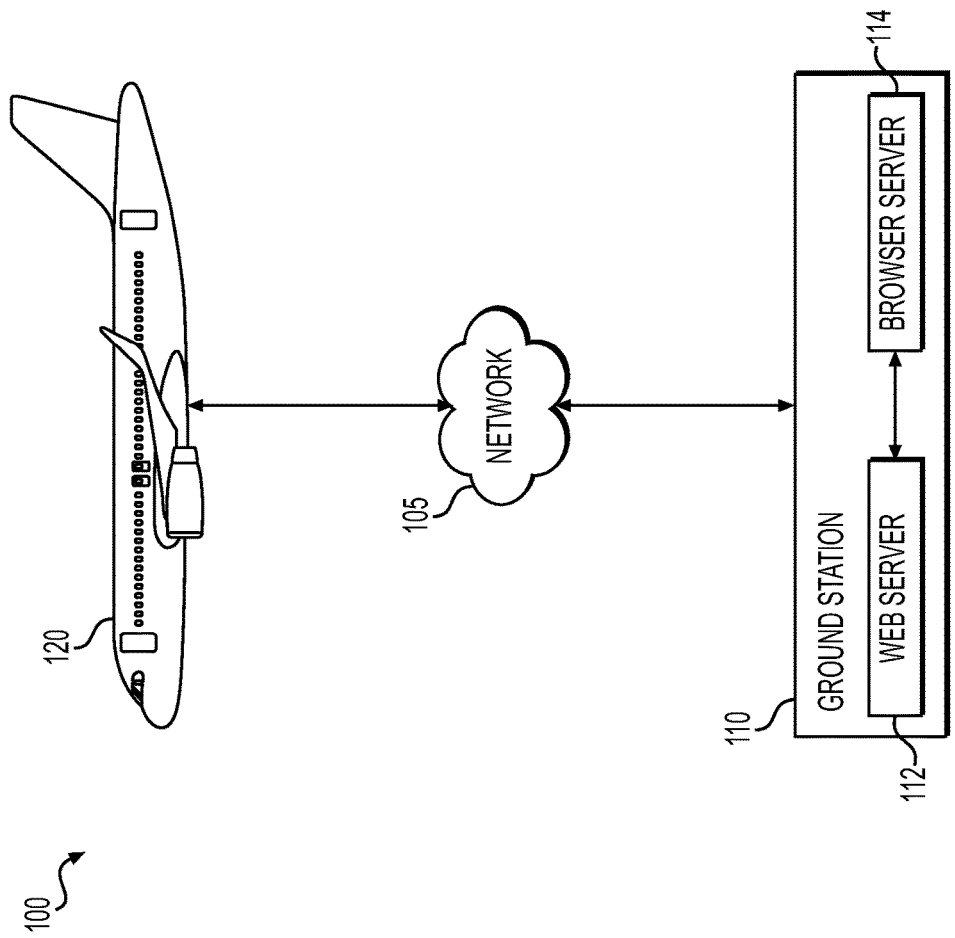
FIG. 1 depicts a block diagram of a system for displaying a remotely executed application on a display of a vehicle, according to one or more embodiments.

The following embodiments describe systems and methods for displaying a remotely executed application on a display of a vehicle. As described above, there is a need to enable application interaction on a forward display (e.g., a cockpit display) or other type of display (e.g., a touchscreen interface unit, satellite data unit display, or the like) of a vehicle. In general, the present disclosure is directed to displaying an application on a display of a vehicle despite the application executing remotely from a computing device including the display of the vehicle (e.g., on a separate device of the vehicle and/or on a remote, ground-based, or other cloud server). As used herein, an application is a program or group of programs designed for end users and may include a set of instructions, modules, and/or procedures that allow for a certain type of computing device operation. Applications may include a browser or a window allowing interaction with the application or program. Application may also include a video signal from a video source, such as a camera. Throughout this disclosure, "application" and "browser" may be used interchangeably.

Embodiments of the present disclosure may provide for hosting the browser on the ground and "piping" video of the browser and control information for manipulating the browser through an IP connection to the vehicle, e.g., via a novel client module. The browser may include a window of information displayed on the display of the vehicle. Video compression technology, such as PC over IP (PCoIP) may enable streaming only the changed pixels over an IP link and recomposing the image on the vehicle. A video router, such as a video multiplexer (mux), may enable selecting among multiple video inputs (e.g., from cameras or other video sources onboard the vehicle). The client module may be included on the existing video router and combined with existing graphics modules and external display onboard the vehicle. In some embodiments, the client module may be included in a separate hardware component in communication with the video router, graphics module, and display.

The video compression technology may also provide a means for the operator (e.g., pilot) to select between an internal source (e.g., onboard cameras or a maintenance computer), or a video path to a ground based server for displaying the browser on the display in the vehicle. For example, the router may route the PCOIP stream to each of the router outputs for display on the display of the vehicle. Further, any of the inputs (e.g., video signals from the onboard cameras) may be streamed to the ground via the PCOIP input port. Thus, systems and methods of the present disclosure may enable two-way video and audio transmission between the vehicle and the ground server.

Embodiments of the present disclosure may enable both local selection of a video source to display on the display of the vehicle and also enable remote selection of a video/audio source to pipe down to the ground (enabling remote security and remote maintenance services). Further, remote actions may be initiated from the ground via output discretes or other I/O interfaces supplied by the router. Embodiments may also enable video chat from the vehicle to the ground or between a mechanic and maintenance personnel. The ground server may record the video signals received from the vehicle. Further, the two-way video and audio transmission may enable information content to be sent to the vehicle via the browser. For example, maps, new travel plans (e.g., flight plans), the latest charts, weather, notice to airmen (NOTAMs), created projections, what-if scenarios, adjustments to the travel plan, performance calculations, three-dimensional (3D) previews of approaches, access to live airport cameras, special mission information, and/or map layers may be sent to the vehicle via the browser. Further, hosting the browser on the ground, or remote from the vehicle, may provide more storage and content capabilities with less accessibility constraints than hosting on the vehicle itself.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Referring now to the appended drawings, FIG. 1 depicts a block diagram of a system 100 for displaying a remotely executed application on a display of a vehicle. As shown in FIG. 1, system 100 may include a ground station 110 and one or more vehicles 120 in communication with each other via a network 105. Network 105 may include, for example, satellite communication, ground-based very high frequency (VHF) datalinks, Wi-Fi, long term evolution (LTE), cellular (e.g., 4G, 5G, or the like) Bluetooth, or any other communications network. Ground station 110 may include remote servers, such as a web server 112 and an application server 114. Web server 112 and/or application server 114 may also include cloud-based servers executed in a cloud computing environment and/or may include any other type of physical servers, virtual servers, or remote servers. As used herein, remote servers are servers located and/or executed offboard from vehicle 120. Web server 112 may communicate with a network, such as the Internet, for providing a connection to the World Wide Web ("the Web") or any private or public server that enables use of remote application or programs and/or two-way video and audio communications. For example, web server 112 may enable users to browse the Web for web pages to access, view, and receive information content, via a browser. Web server 112 may also enable users interact with applications to access, view, and receive information content from the applications.

As described above, the present disclosure is directed to embodiments in which an application that is displayed onboard a vehicle (e.g., an aircraft) may be hosted offboard, e.g., on application server 114. Application server 114 may be in communication with web server 112 through, for example, a public or private network. The application may be, for example, a browser that is able to access information on the Web via web server 112. For example, the application, or browser, may provide a window of information displayed on a display 121 (shown in FIG. 2) of the vehicle 120. Accordingly, application server 114 may provide information content to a user through the Web or other network. The information content may include information relevant to vehicle 120, such as, for example, obstacle detection information, charts, weather, notices to airmen (NOTAMs), projections, what-if scenarios, travel plan (e.g., flight plan), adjustments to the travel plan, or any other information that may be relevant to an operator of the vehicle 120.

The application server 114 may also provide a video signal to vehicle 120 from a video source offboard the vehicle 120. For example, application server 114 may be in communication with one or more video sources (e.g., cameras) and may receive one or more video signals from the one or more video sources. The application server 114 may then route, or send, the video signals to the vehicle 120 for display on the vehicle 120, as detailed below. It is understood that web server 112 and application server 114 may include separate servers and/or may be included in a single server. Application server 114 may include a remote display protocol encoder, such as PC over IP (PCoIP), for video compression and hosting the application. The remote display protocol may deliver bitmaps, which define where a pixel appears on a display and what color the pixel should be, by encoding the bitmaps on a remote host (e.g., application server 114) and then streaming the data to a secure portal client module 130, as detailed below with respect to FIGS. 3 and 4. For example, application server 114 may compress and encrypt the video and audio signal containing the application prior to sending the application to the vehicle 120. Accordingly, the application may be hosted on application server 114 at ground station 110. The application itself and/or images or at least pixels of the application and its contents may be streamed to vehicle 120 in real-time and an operator of the vehicle 120 may interact with the application to obtain information content, as detailed further below.

Vehicle 120 may communicate with application server 114 via network 105 to receive a display of the application, video signal, and/or browser and information content. Vehicle 120 may include any vehicle capable of connecting to a network, such as network 105, for receiving and displaying information content. For example, vehicle 120 may include an aircraft (e.g., airplanes, helicopters, etc.). However, it is understood that vehicle 120 may include spacecraft, motor vehicles (e.g., motorcycles, cars, trucks, buses, etc.), railed vehicles (e.g., trains, trams, etc.), watercraft (e.g., ships, boats, submarines, etc.), and/or amphibious vehicles (e.g., hovercraft, screw-propelled vehicles, etc.). Vehicle 120 may receive images or at least pixels of a display of the application, video signal, and/or browser through network 105 and the application, video signal, and/or browser may be displayed on a display 121 of the vehicle 120, as detailed further below.

Figure 2:
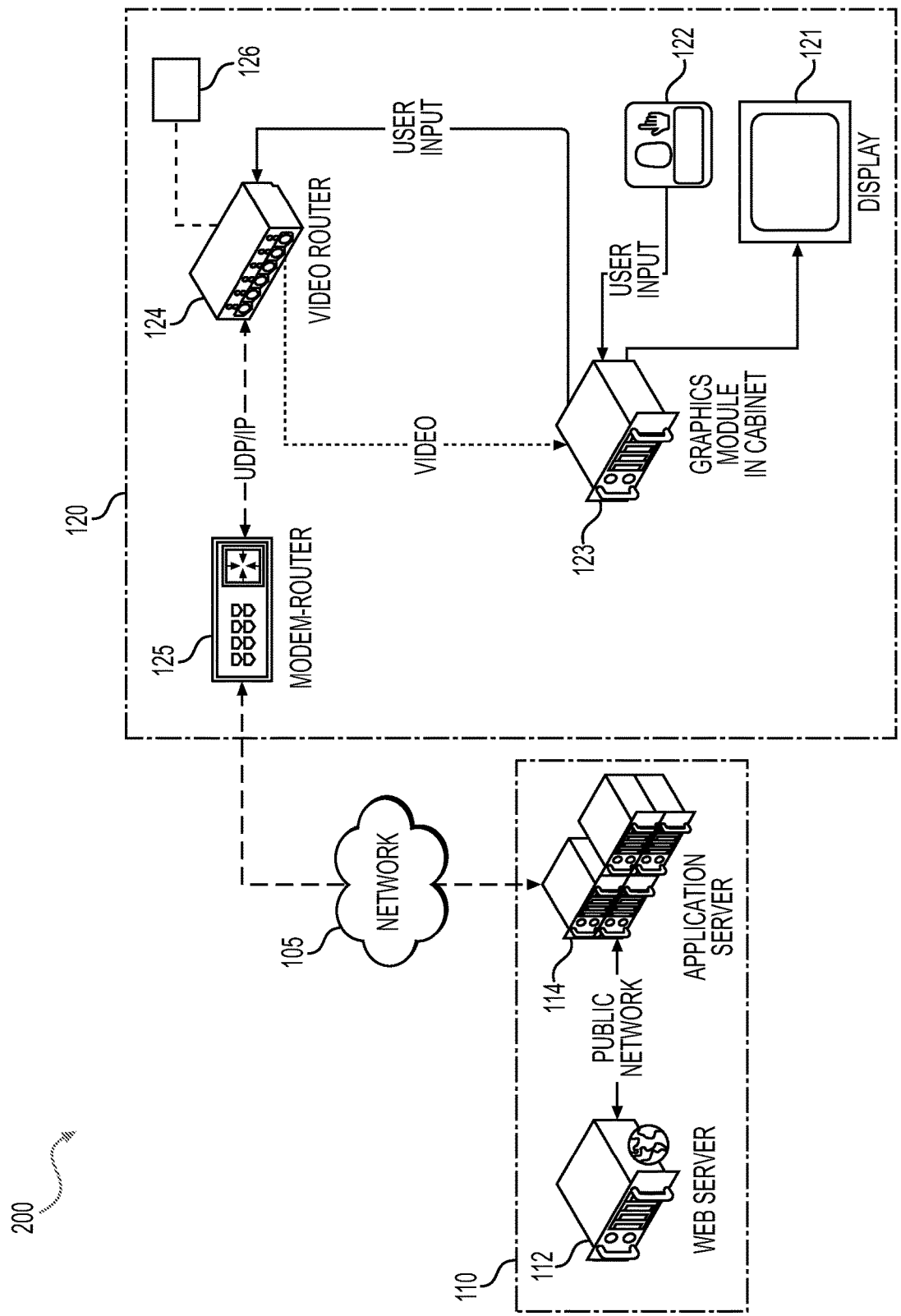
FIG. 2 depicts a network architecture for displaying a remotely executed application on a display of the vehicle of FIG. 1, according to embodiments of the present disclosure

FIG. 2 depicts a network architecture 200 for displaying a remotely executed application on a display 121 of a vehicle 120, according to embodiments of the present disclosure. As shown in FIG. 2, vehicle 120 may include an onboard display 121, input device 122, a graphics module 123, a secure portal enabled video router 124, and a modem-router 125. Modem-router 125 may communicate with application server 114 via network 105. Modem-router 125 may include, for example, an aircraft data gateway (ADG), satellite communications terminals, or the like, for wirelessly transferring data on and off vehicle 120. However, modem-router 125 may include any modem and/or router onboard vehicle 120 for communicating with application server 114. Video router 124 may receive one or more video signals from one or more onboard video sources 126, such as one or more cameras. The video sources 126 may be located at various locations on vehicle 120 and/or may be located offboard vehicle 120 (e.g., at an airport, at ground station 110, or any other location offboard vehicle 120). For example, vehicle 120 may include a cockpit camera, a tail camera, wing cameras, cabin cameras, or cameras located at any other location on vehicle 120. It is understood that vehicle 120 may include any number of video sources 126 positioned at any location on and/or in vehicle 120.

As further shown in FIG. 2, video router 124 may selectively send the one or more video signals from the one or more video sources 126 to graphics module 123. Graphics module 123 may be part of a hardware cabinet and/or may be located directly within display 121. The cabinet may include modules for computing, database storage, input/output, network communication, and power supply. Vehicle 120 may include one or more cabinets with one or more graphics modules 123. Graphics module 123 may include a graphics card and/or a sound card for displaying the one or more video signals on display 121. The video signals may also include audio signals as well. For example, the audio signals may be received from a microphone or similar audio capturing device.

The display 121 may be a forward display located in an operator area of vehicle 120. For example, the display 121 may be located in a cockpit of an aircraft, a bridge of a ship, a car dashboard, or the like. However, display 121 may be located anywhere in vehicle 120 and may include any type of display in vehicle 120. For example, display 121 may include a touchscreen interface unit display, a satellite data unit display, or the like. Further, it is understood that display 121 may include a display integrated into the components of vehicle 120 and/or may include a display that is separate from the vehicle 120 components, such as an electronic flight bag (EFB), tablet device, mobile device, or the like.

A user, such as the operator of the vehicle 120, may select a video signal to be displayed on display 121 via user input on input device 122. Input device 122 may include, for example, a cursor, a keyboard, a touch screen, physical or digital buttons and/or switches, or the like. The video router 124 may receive the user input from input device 122 via graphics module 123. It is understood that input device 122 may feed directly into display 121 or any other component and may include any number of input devices 122. The user input may indicate a selection of one or more video signals to be displayed on display 121. Video router 124 may send the selected one or more video signals to graphics module 123 to display 121 the selected video signals on display 121. It is understood that the video signals may include video signals from the video sources 126 onboard vehicle 120 and/or may include video signals from video sources 126 offboard vehicle 120.

In the exemplary embodiment, video router 124 may also receive a display of the application (e.g., a browser or other window) and/or a video signal from an offboard video source 126 from application server 114 for displaying the application and/or video on display 121. For example, video router 124 may be in communication with a secure portal client module 130 (shown in FIGS. 3 and 4) for receiving a video signal displaying images or at least pixels of the application such that the application and its contents may be displayed on the display 121, as detailed further below. Video router 124 may communicate with modem-router 125 via, for example, user datagram protocol (UDP), transmission control protocol (TCP), or the like, to receive the application and/or video signal from application server 114 through network 105.

Figure 3:
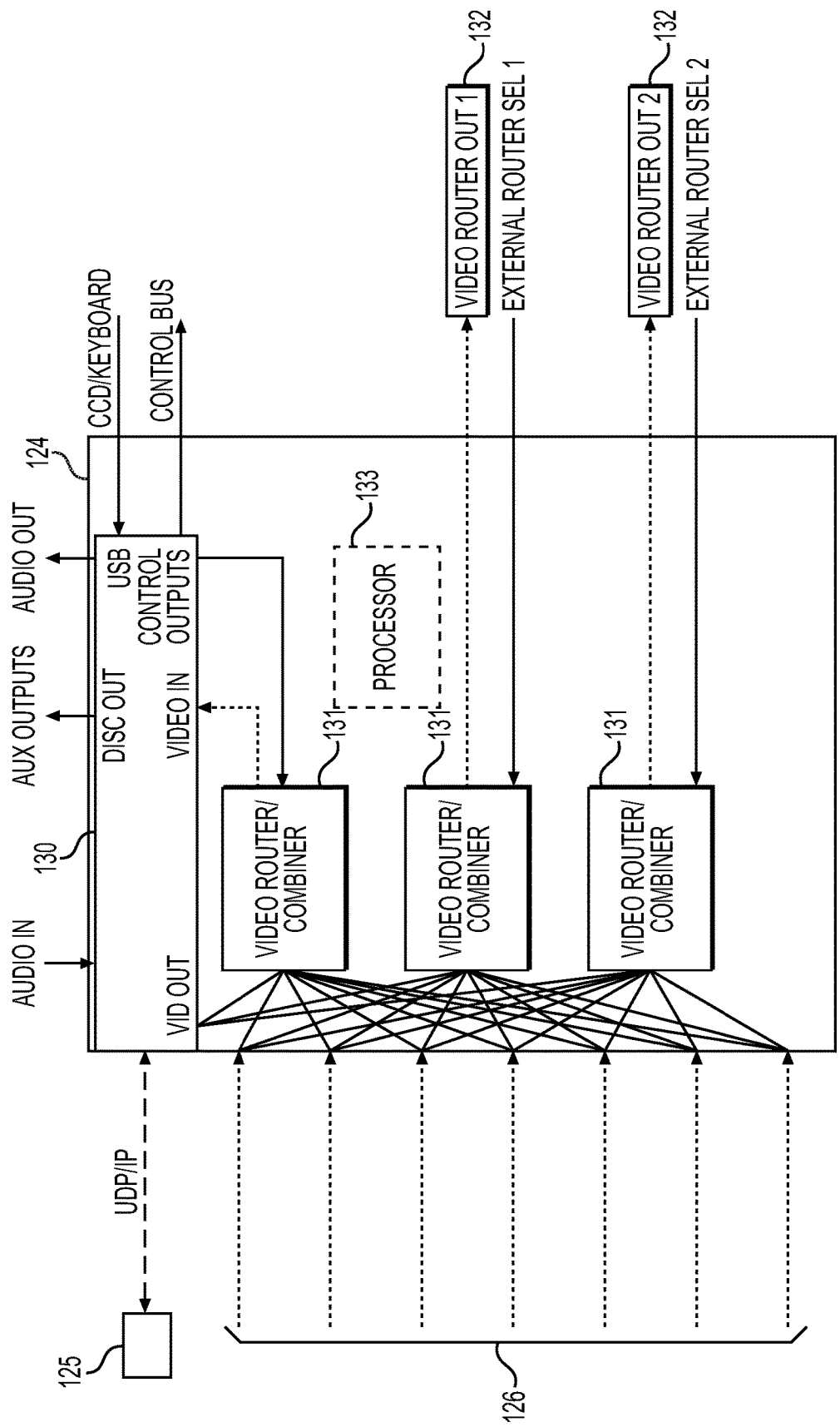
FIG. 3 depicts a block diagram of an exemplary video module of the network architecture of FIG. 2, according to one embodiment.
Figure 4:
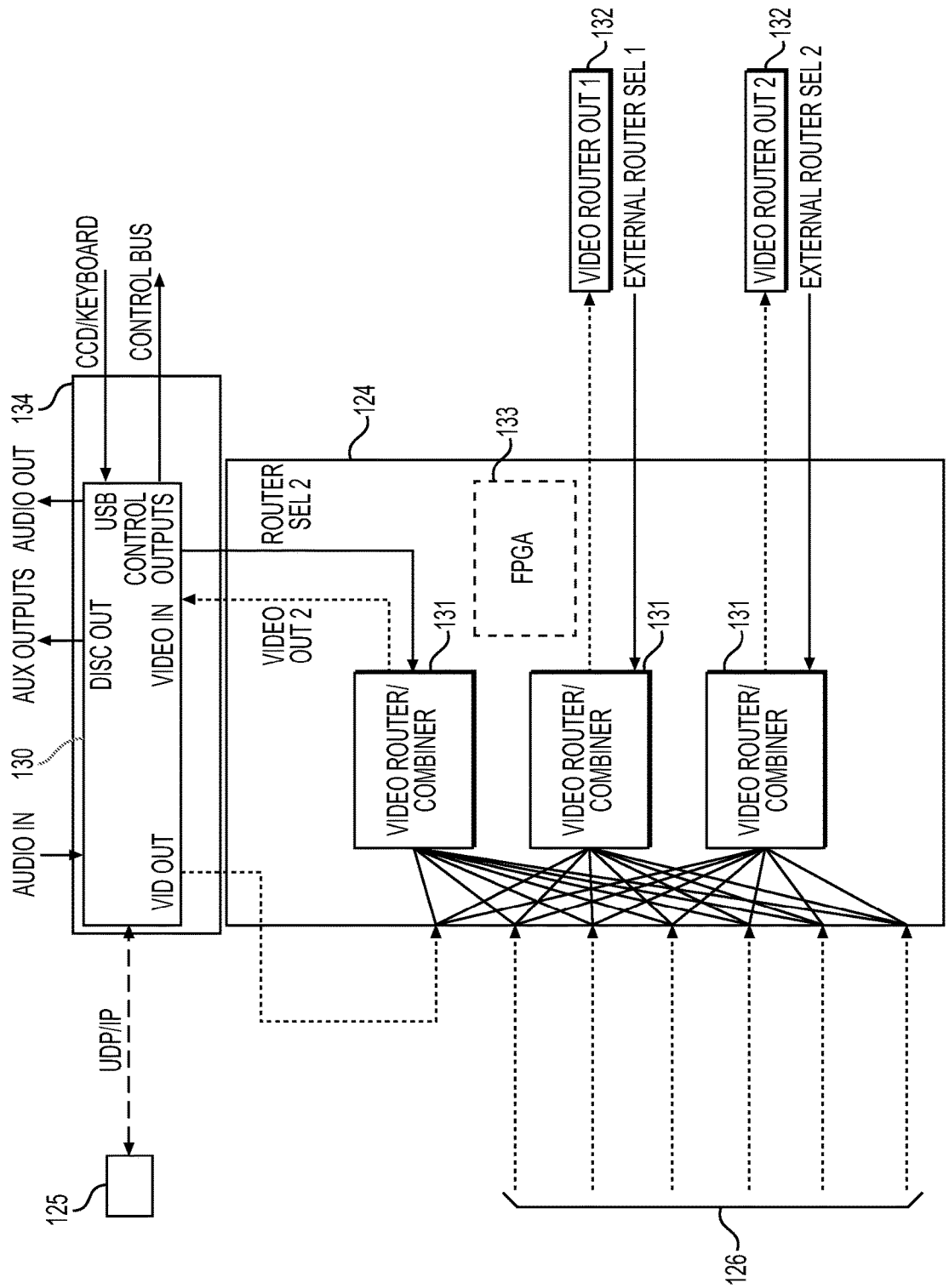
FIG. 4 depicts a block diagram of the exemplary video module, according to another embodiment.

FIG. 3 depicts a block diagram of an exemplary secure portal client module 130, according to one embodiment. FIG. 4 depicts a block diagram of the exemplary secure portal client module 130, according to another embodiment. In the discussion that follows, reference will be made to both FIGS. 3 and 4. As shown in FIGS. 3 and 4, video router 124 may include one or more combiners 131 for combining the one or more video signals from video sources 126 and a video signal from a maintenance computer and/or another router. For example, the combiners 131 may receive each of the one or more video signals, combine the received one or more video signals, and output the selected video signals to graphics module 123 through outputs 132 for displaying the selected video signals on display 121. Video router 124 may also include a configurable integrated circuit (e.g., a processor 133), such as a field-programmable gate array (FPGA), for enabling a user to program conditional logic for video router 124. For example, the logic may include instructions for outputting a selected video signal based on the user input. Processor 133 may also encode and/or decode information to and/or from the remote servers (e.g., web server 112 and/or application server 114) and may provide interfaces to other systems.

Client module 130 may be included in video router 124 (FIG. 3) or may be included as a separate hardware component, such as a secure portal client unit 134 (FIG. 4) onboard vehicle 120. Client module 130 may be implemented and/or executed by one or more processors, such as processor 620, detailed with respect to FIG. 6 below.

As further shown in FIGS. 3 and 4, client module 130 may include audio input, audio output, and auxiliary outputs. Client module 130 may also include a port, such as a USB port, for connecting to (e.g., physically through cables and/or wirelessly), and communicating with, the input device 122 for receiving user input (e.g., to select a video signal for display and/or interacting with, and controlling, the application). A control outputs port may be in communication with combiners 131 for sending a selection from the user input to the one or more combiners 131. The control outputs port may also be in communication with a control bus to enable remote operations on vehicle 120 from the remote servers (e.g., set off an alarm if the remote servers detect an intruder on a video input originating from vehicle 120). Client module 130 may be in communication with application server 114 via modem-router 125 for receiving the application through network 105. For example, client module 130 may communicate with modem-router 125 via UDP/IP (or any other type of communication connection) and may receive the compressed and/or encrypted video signal containing the application. Client module 130 may include a PCoIP decoder for decrypting the video signal. The client module 130 may include a video output port and a video input port. The application may be sent to the combiners 131 through the video output port and the user may select the application using input device 122 to display the application on display 121. After the application is displayed on display 121, the user may interact with the application via input device 122 to control the application and receive desired information content (e.g., maps, charts, weather, NOTAMs, projections, what-if scenarios, travel plans, adjustments, performance calculations, 3-dimensional previews of approaches, access to live airport cameras, special mission information, or map layers, etc.).

Client module 130 may also receive the one or more video signals from the video sources 126 and/or a maintenance computer through video input port. The client module 130 may send select video signals to the ground station 110 through network 105 via modem-router 125. For example, client module 130 may receive a selection of video signals from a user at ground station 110 via a remote selection and may send the selected video signals to the ground station 110. Thus, client module 130 may enable video signals from video sources 126 (or a maintenance computer) onboard vehicle 120 to be displayed on display 121 and/or sent to ground station 110, and may also enable the application and/or video signals from video sources offboard vehicle 121 to be displayed on display 121.

Figure 5:
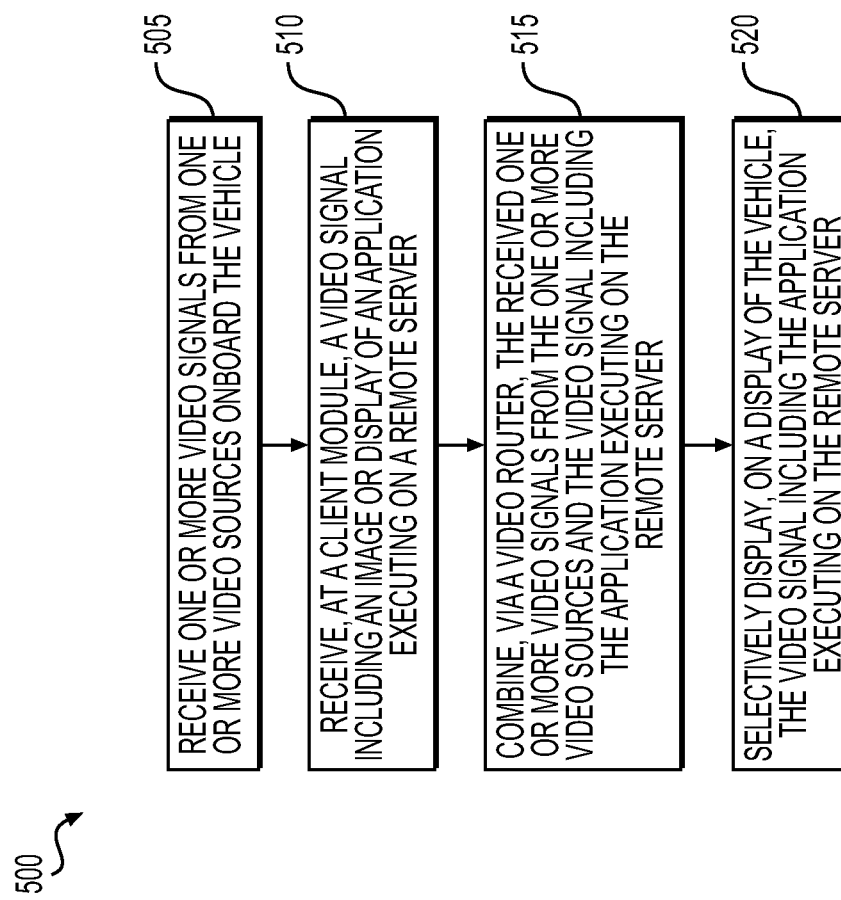
FIG. 5 depicts a flowchart of a method for displaying a remotely executed application on a display of a vehicle of the system of FIG. 1.

FIG. 5 depicts a flowchart of a method 500 for displaying a remotely executed application on a display of a vehicle. In an initial step 505, the one or more processors (e.g., processor 620) executing client module 130 may receive one or more video signals from one or more video sources 126 onboard vehicle 120.

In step 510, the one or more processors may receive, at client module 130, a video signal including an image or display of the application executing on a remote server (e.g., application server 114) through network 105. The one or more processors may likewise receive, at client module 130, a video signal from an offboard video source from application server 114 through network 105. The video signal including the image or display of the application and/or from the offboard video source may be received via a remote display protocol, such as PCoIP. For example, the video signal including the application (e.g., including video and/or audio) may be compressed and encrypted by application server 114 at ground station 110, and sent to client module 130 through network 105 via modem-router 125. Client module 130 may decompress and decrypt the video signal including the remotely executed application. Accordingly, client module 130 may receive the image or display of the application similar to a remote desktop. The application may include information related to the trip of the vehicle 120 (e.g., maps, charts, weather, NOTAMs, projections, what-if scenarios, travel plans, travel plan adjustments, performance calculations, 3-dimensional previews of approaches, access to live airport cameras, special mission information, or map layers).

In step 515, the one or more processors may combine, via video router 124, the received one or more video signals from the video sources 126 and the video signal including the application executing on application server 114. The one or more processors may also combine, via video router 124, the received one or more video signals form the one or more video sources 126 onboard the vehicle and the received one or more video signals from the one or more offboard video sources 126.

In step 520, the one or more processors may selectively display the video signal including the application executing on application server 114 on display 121. For example, the one or more processors may receive a selection of one or more of the video signals from a user input and display the selected video signals on the display 121. The one or more processors may also selectively display on the display 121 at least one of the one or more video signals from the one or more offboard video sources 126.

In some embodiments, the one or more processors may also receive user input from a user (e.g., input device 122) and control the application executing on the remote server based on the received user input. For example, the one or more processors may display information related to a trip of the vehicle on the display 121 through the application. Thus, the user (e.g., pilot or crew of the vehicle) may interact with, and control, the application executing on the remote server. The one or more processors may also display a video signal from an offboard video source 126 on the display 121.

In some embodiments, the one or more processors may also send at least one of the video signals form the video sources 126 to the remote server (e.g., at ground station 110). For example, the one or more processors may receive a remote selection of one or more of the video signals and may send the selected video signals to the ground station 110.

Figure 6:
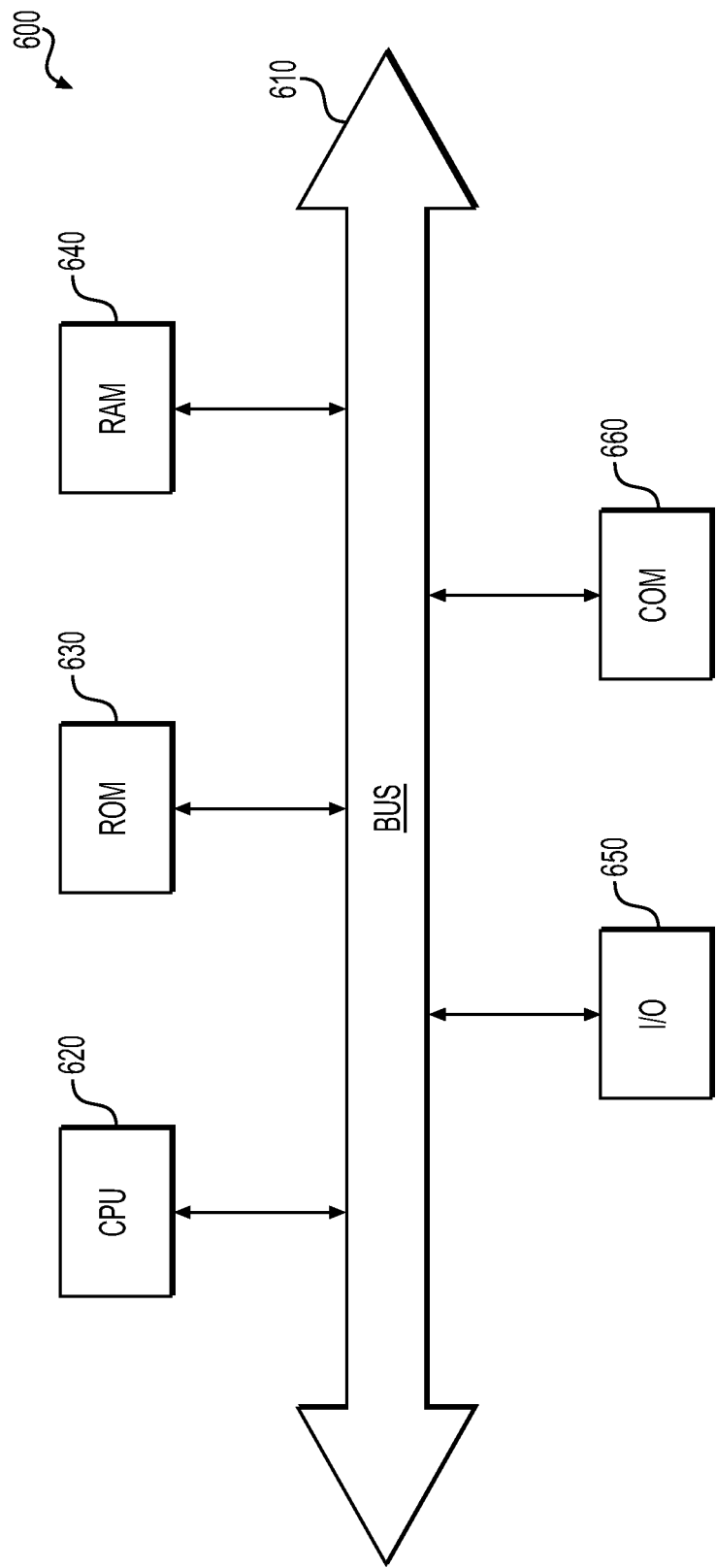
FIG. 6 depicts a high-level functional block diagram of an exemplary computer device or system, in which embodiments of the present disclosure, or portions thereof, may be implemented.

FIG. 6 depicts a high-level functional block diagram of an exemplary computer device or system, in which embodiments of the present disclosure, or portions thereof, may be implemented, e.g., as computer-readable code. For example, each of the exemplary systems, user interfaces and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-5 may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 may also include a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 may also include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for displaying a remotely executed application on a display of a vehicle, the method comprising:
   receiving, by one or more processors, one or more video signals from one or more video sources onboard the vehicle;
   receiving, by the one or more processors, at a client module, a video signal including an image or display of the application executing on a remote server through a network;
   combining, by the one or more processors, via a video router, the received one or more video signals from the one or more video sources onboard the vehicle and the video signal including the image or display of the application executing on the remote server; and
   selectively displaying, by the one or more processors, on a display of the vehicle, the video signal including the image or display of the application executing on the remote server.

2. The method of claim 1, further comprising:
   receiving, by the one or more processors, at the client module, one or more video signals from one or more offboard video sources;
   combining, by the one or more processors, via the video router, the received one or more video signals from the one or more video sources onboard the vehicle and the received one or more video signals from the one or more offboard video sources; and
   selectively displaying, by the one or more processors, on the display of the vehicle, at least one of the one or more video signals from the one or more offboard video sources or the one or more video signals from the one or more video sources onboard the vehicle.

3. The method of claim 1, further comprising:
   receiving, by the one or more processors, user input from a user; and
   controlling, by the one or more processors, the application executing on the remote server based on the received user input.

4. The method of claim 3, wherein the controlling, by the one or more processors, the application executing on the remote server based on the received user input includes:
   displaying, by the one or more processors, through the application on the display, information related to a trip of the vehicle.

5. The method of claim 1, further comprising:
   sending, by the one or more processors, through the network, at least one of the one or more video signals from the one or more video sources onboard the vehicle to the remote server.

6. The method of claim 1, wherein the selectively displaying, by the one or more processors, on a display of the vehicle, the video signal including the image or display of the application executing on the remote server includes:
   receiving, by the one or more processors, a selection of one or more of the video signals from a user input; and
   displaying, by the one or more processors, the selection of the one or more video signals on the display of the vehicle.

7. The method of claim 1, wherein the client module is included in the video router.

8. The method of claim 1, wherein the client module includes a hardware component in communication with the video router.

9. The method of claim 1, wherein the remote server is located at a ground station.

10. The method of claim 1, wherein the vehicle is an aircraft and the display is in a cockpit of the aircraft.

11. A system for displaying a remotely executed application on a display of a vehicle, comprising:
- a vehicle;
- one or more video sources located onboard the vehicle;
- a display onboard the vehicle;
- a remote server located offboard the vehicle;
- a video router onboard the vehicle and in communication with the display; and
- one or more processors in communication with the video router, the one or more processors configured to:
  - receive one or more video signals from the one or more video sources located onboard the vehicle;
  - receive, at a video module, a video signal including an image or display of an application executing on the remote server through a network;
  - combine, via the video router, the received one or more video signals from the one or more video sources located onboard the vehicle and the video signal including the image or display of the application executing on the remote server; and
  - selectively display on the display of the vehicle, the video signal including the image or display of the application executing on the remote server.

12. The system of claim 11, wherein the one or more processors are further configured to:
- receive, at the client module, one or more video signals from one or more offboard video sources;
- combine, via the video router, the received one or more video signals from the one or more video sources onboard the vehicle and the received one or more video signals from the one or more offboard video sources; and
- selectively display on the display of the vehicle, at least one of the one or more video signals from the one or more offboard video sources or the one or more video signals from the one or more video sources onboard the vehicle.

13. The system of claim 11, wherein the one or more processors are further configured to:
- receive user input from a user; and
- control the application executing on the remote server based on the received user input.

14. The system of claim 13, wherein the controlling the application executing on the remote server based on the received user input includes:
displaying, through the application on the display, information related to a trip of the vehicle.

15. The system of claim 11, wherein the one or more processors are further configured to:
send, through the network, at least one of the one or more video signals from the one or more video sources onboard the vehicle to the remote server.

16. The system of claim 11, wherein the selectively displaying, on the display of the vehicle, the video signal including the image or display of the application executing on the remote server includes:
- receiving a selection of one or more of the video signals from a user input; and
- displaying the selection of the one or more video signals on the display of the vehicle.

17. The system of claim 11, wherein the client module is included in the video router.

18. The system of claim 11, wherein the client module includes a hardware component in communication with the video router.

19. The method of claim 11, wherein the remote server is located at a ground station.

20. A computer-implemented method for displaying a remotely executed application on a display of a vehicle, comprising:
- receiving, by one or more processors, one or more video signals from one or more video sources;
- receiving, by the one or more processors, at a client module, a video signal including an image or display of the application executing on a remote server through a network;
- combining, by the one or more processors, via a video router, the received one or more video signals from the one or more video sources and the video signal including the image or display of the application executing on the remote server;
- receiving, by the one or more processors, a selection of one or more of the video signals from a first user input;
- based on the received selection, displaying, by the one or more processors, on a display of the vehicle, the video signal including the image or display of the application executing on the remote server;
- receiving, by the one or more processors, a second user input from a user; and
- controlling, by the one or more processors, the application executing on the remote server based on the received user input.

* * * * *